United States Patent [19]
Griffith et al.

[11] 3,884,682

[45] May 20, 1975

[54] RECOVERING COPPER FROM ACIDIC SOLUTIONS BY CONTINUOUS CEMENTATION

[75] Inventors: William A. Griffith; Howard E. Day, both of Osburn, Idaho; Clarence A. Lefler, Casa Grande, Ariz.; Stephen M. Cottam, Osburn, Idaho

[73] Assignee: Hecla Mining Company, Wallace, Idaho

[22] Filed: Apr. 6, 1973

[21] Appl. No.: 348,586

[52] U.S. Cl. .................................. 75/109; 75/107
[51] Int. Cl. ............................................ C22h 15/12
[58] Field of Search .............................. 75/109, 117

[56] References Cited
UNITED STATES PATENTS

| | | |
|---|---|---|
| 1,671,004 | 5/1928 | Bagsar .................................. 75/109 |
| 2,204,898 | 6/1940 | Lee et al. ............................. 75/109 |
| 3,154,411 | 10/1964 | Back et al. ........................... 75/109 |
| 3,282,675 | 11/1966 | Parker .................................. 75/109 |
| 3,288,598 | 11/1966 | Hogue .................................. 75/109 |
| 3,333,953 | 8/1967 | Zimmerly et al. .................... 75/109 |
| 3,679,399 | 7/1972 | Linton et al. ......................... 75/109 |

Primary Examiner—Oscar R. Vertiz
Assistant Examiner—Brian E. Hearn
Attorney, Agent, or Firm—Hofgren, Wegner, Allen, Stellman & McCord

[57] ABSTRACT

A method and apparatus for recovering copper from dilute acidic solutions of copper in a continuous manner and with the final products being a barren solution substantially free of dissolved copper and separated solids containing precipitated or cement copper in which the precipitating medium is a less noble metal than copper of which finely divided iron is preferred.

6 Claims, 1 Drawing Figure

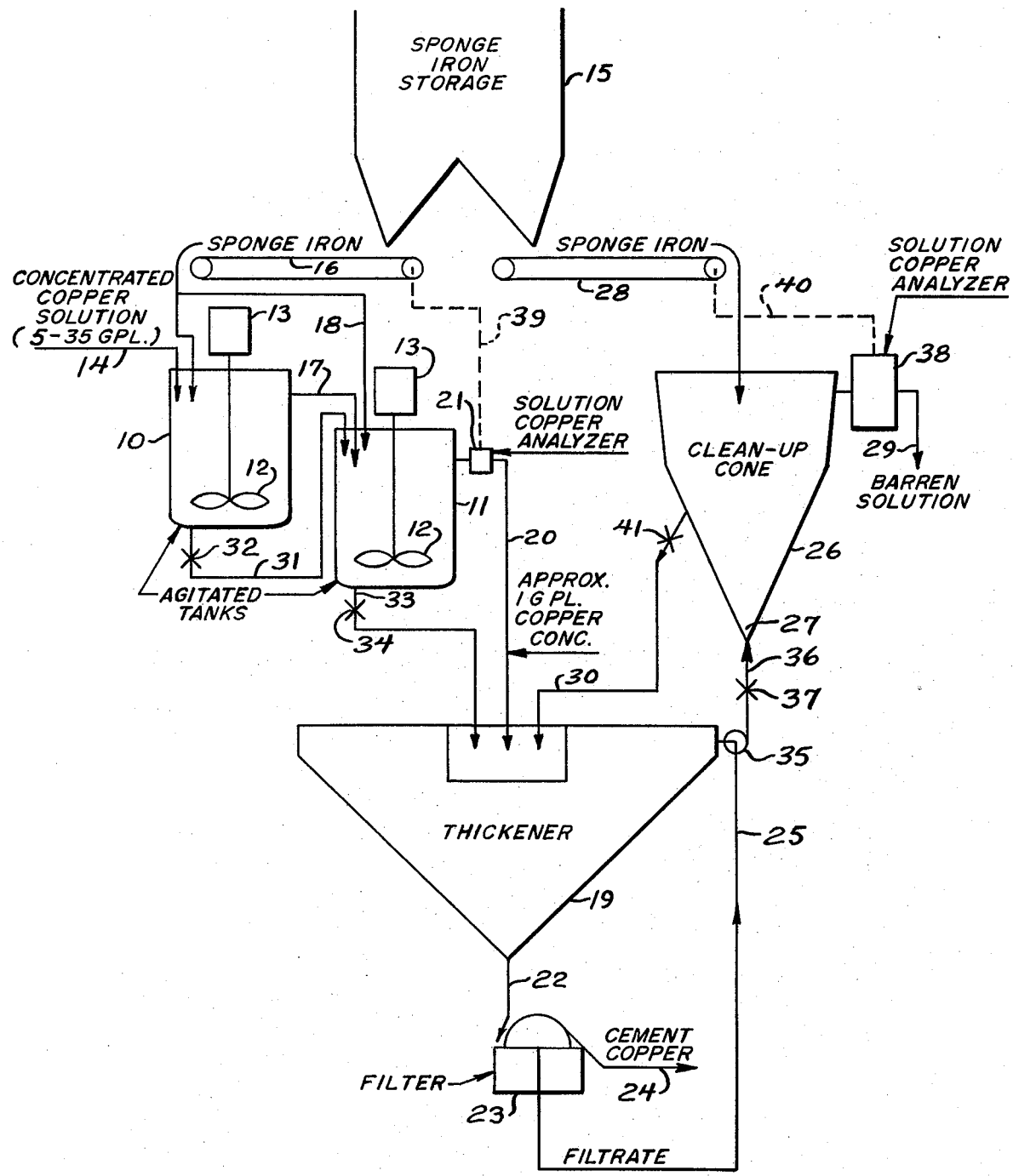

RECOVERING COPPER FROM ACIDIC SOLUTIONS BY CONTINUOUS CEMENTATION

BACKGROUND OF THE INVENTION

This invention relates to a method of recovering copper from a dilute acidic solution containing greater than 5 grams per liter of dissolved copper as a salt comprising contacting the solution with iron to precipitate copper and leave a solution with a maximum dissolved copper content of about 1 gram per liter, separating the precipitated or solid copper from the solution, contacting the resulting solution with more iron to precipitate substantially all of the remaining copper from the solution and forming a substantially copper free barren solution and separating the barren solution from the solids which contain the precipitated copper.

Another feature of the invention is to provide an improved metallurgical precipitation system for recovering copper from a dilute acidic solution thereof containing greater than 5 grams per liter comprising apparatus for contacting the solution with iron to form a resulting solution with a copper content of approximately 1 gram per liter while precipitating solid or cement copper, a device for separating the solution from the precipitated copper, a device for subjecting the separated solution to more iron to precipitate the remaining copper from solution and produce a substantially copper free barren solution and separator apparatus for separating the barren solution from the copper containing solids.

DESCRIPTION OF THE PRIOR ART

The most pertinent prior art of which applicants are aware is the following. U.S. Pat. No. 3,154,411 describes an apparatus and method in which the system is cyclic in nature rather than continuous as in the case of the present invention and with the solution contacting portion of the apparatus comprising cones. Because of the cyclic nature of the operation it is necessary in order to get good iron utilization and maintain cement copper quality to interrupt the feeding of iron for some time prior to the cyclic discharge of the cement copper product. This results in a surge of copper lost in the effluent solution during the discharge time. The higher the copper concentration in the feed acidic solution the more frequent the interruptions for product discharge and the higher the total soluble copper losses. Although it is possible to avoid frequent discharging of the cone when using solutions of high copper concentration by recycling a portion of the effluent liquid in order to dilute the incoming stream of the acidic solution this also has disadvantages as such an operation requires either larger cone devices or a greater number. In addition, the labor requirements are also increased.

Another item of prior art is U.S. Pat. No. 3,288,598 but here also the system is cyclic in operation and presents the same problems of poor copper recovery especially when the concentration of copper in the feed solution is relatively high.

The above methods and systems which exemplify the prior art have the additional defects as follows:

The copper produced in these devices accumulates in the reaction zone or some nearby location and the process must be interrupted in order that the equipment may be cleaned or flushed as part of a regular process cycle for cement copper recovery. The frequency at which these devices are cleaned or flushed is dependent on the concentration of the incoming cupric solution, and the more highly concentrated the feed stream the more frequent the flushing or cleaning step is necessary. With highly concentrated solutions, the cleaning cycles become so frequent as to make the operation of a plant inefficient and requires high labor and material handling costs.

The reaction of highly concentrated cupric solution on iron often produces a very dense and adherent layer of metallic copper on the metallic iron surface. The adherent copper layer can slow down the cementation reaction and causes problems in the separation of metallic copper from unreacted iron.

In contrast to this prior art, the method and system of this invention is not cyclic in operation but is continuous and can use feed solutions of high dissolved copper content without any problem of poor copper recovery as was true in the prior art.

SUMMARY OF THE INVENTION

The method and apparatus for treating an aqueous solution of a metal salt with a less noble metal in order to precipitate the first metal from the solution with resulting formation and dissolution of the corresponding salt of the less noble metal is a well known commercial process of which much information has been published including the two prior art patents discussed above. An example of this is the treatment of a dilute acidic solution of copper with metallic iron which can be expressed in simplified form by the following equation:

$$CuSO_4 \text{ (aq.)} + Fe^\circ \rightarrow Cu^\circ + FeSO_4 \text{ (aq.)}$$

This reaction is called cementation and the copper so produced is commonly known as cement copper.

This invention provides an improved process and system for treating metallic bearing solutions regardless of the concentration of the metal therein for recovery of the dissolved metal by cementation. The individual items of equipment used in this system are well known both in structure and operation but the combination of devices used herein and the method disclosed herein are novel.

Thus in this invention the precipitation of the copper from the dilute acidic solution is continuous, the precipitated copper leaves a concentration in the resulting solution of approximately 1 gram per liter, even this small amount is precipitated by adding a fresh amount of the less nobel metal such as iron to precipitate substantially all the remainder and leave a substantially barren solution and the precipitant including the cement copper is thereby separated from the liquid which can be discarded.

BRIEF DESCRIPTION OF THE DRAWING

The single FIGURE of the accompanying drawing illustrates diagrammatically the new system and method and uses well known items of equipment in a novel flow diagram.

DESCRIPTION OF THE PREFERRED EMBODIMENT

In the single FIGURE of the drawing there is arranged one or more, and customarily a plurality in successive series, of apparatus such as the tanks 10 and 11 each provided with propeller or other type mixer blade 12 driven by an electric or other type motor 13.

In the illustrated embodiment two agitated tanks 10 and 11 are employed in series, although more than two can be used if desired or required. The reason why two tanks are used is to insure that there is no substantial "shortcircuiting" of iron and particularly the iron particles through the line 20 into the thickener 19.

This copper solution is conducted into the first tank 10 by a pipe 14 and sponge iron or similar finely divided iron is introduced into this first tank 10 from an iron storage supply 15 by way of a variable feeder 16 of any type desired so that the amount of iron introduced into the first tank 10 can be easily controlled. The solution and iron are maintained thoroughly mixed by operation of the propeller blades 12 so that the solution and the iron are maintained in a relatively mixed condition for precipitating the copper from the solution.

Because of the high concentration of the incoming copper solution into the first tank the partially copper depleted solution is conveyed from the top portion of the first tank 10 through a pipe 17 to the second tank 11. The sponge iron from the variable feeder 16 is directed as indicated into the first agitated tank 10 and then, as desired, into the second tank 11 by way of the transfer line 18.

The contact of the solution in the two tanks 10 and 11 with the solid iron reduces the copper content of the solution by the time it reaches the discharge of the second or last tank 11 to a very low value. The copper content of the solution through the pipe or line 20 is continuously analyzed by a solution copper analyzer 21 which is a commercially available item and the copper content controls the rate at which the iron is fed into the agitated tank 10 by way of the variable feeder 16.

The tank 10 is provided with a drain line 31 with a valve 32 while the tank 11 is provided with a drain line 33 with a valve 34. These are used to bleed coarse copper precipitated from the agitated tanks into the thickener 19. The line 31 serves as a bleed line for coarse copper particles that have grown in the agitated tank 10 and iron mixed therewith and the line 31 is directed into the top of the second agitated tank 11. The drain line 33 from this second tank leads into the top of the thickener 19.

From the thickener 19 the solids are conducted by way of a line 22 to a filter 23 of customary type where the solids which contain the cement copper are separated and conducted by a line 24 to a place of utilization.

The overflow from the thickener 19 is supplied to the bottom 27 of the cone 26 by a pump 35 and a line 36 provided with a valve 37. This comprises the major portion of the liquid supplied to the cone 26. The remainder of the liquid consists of filtrate also supplied to the bottom of the cone 26 by way of the pipe 25 and pump 35 together with the previously mentioned line or pipe 36 and valve 37.

In the clean-up cone 26 the necessary iron is supplied by way of a second variable feeder 28 and a second solution copper analyzer 38 is provided in the effluent barren solution line 29 for controlling the feed of iron by the feeder 28 into the cone 26. The association of the analyzer 21 with the feeder 16 is indicated diagrammatically by the dotted line 39. Similarly, the association of the analyzer 38 with the feeder 28 is indicated by the dotted line 40.

In this clean-up cone 26 the remaining approximately one gram per liter of dissolved copper is separated and the resulting substantially copper free or barren solution is conducted from the top of the cone 26 by way of a pipe 29 to a place of disposal.

The remaining copper in the liquid in the clean-up cone 26 is displaced from solution by the iron from the feeder 28 in an area of the cone intermediate the top and bottom thereof. This suspended copper with the liquid in which it is suspended is drawn from the upper side of the cone 26 by the line 30 which contains control valve 41 and is also directed into the thickener 19. The cement copper from the thickener is separated from the filtrate in the filter 23 and the cement copper is directed outwardly as indicated at 24 while the resulting filtrate is conveyed up into the bottom of the cone 26 as described. This draining of the suspended copper and the liquid in which it is suspended from the side of the cone 26 through the line 30 is done periodically in order to remove suspended copper and prevent its being expelled with the barren solution through the pipe or line 29. Thus all of the cement copper from the tank or tanks 10 and 11 and the final clean-up cone 26 is separated by the filter 23 and directed therefrom through the line 24.

In this invention the method and system can use any kind of a clean-up device to remove the last remnants of copper before expelling the substantially copper free barren solution. Thus, instead of the clean-up cone illustrated operating on particulate iron such as sponge iron, the clean-up could be a V-trough operating with particulate iron.

The liquid leaving the last agitated tank 11 comprises a slurry that contains cement copper particles and the above described solution of low cupric copper. The analyzer 21 which controls the rate of iron fed by the feeder 16 continuously determines the concentration of cupric ion in the solution portion of the slurry so that this effluent contains the desired low copper value which in the illustrated embodiment is about 1 gram per liter. This analyzer also develops a signal that controls in a customary and well known manner the rate of iron addition to the tanks 10 and 11 so that the cupric copper content of the effluent through the pipe 20 is maintained at a preset level.

The retention time in the agitated tank or tanks 10 and 11 is preferably between about 3 and 30 minutes in order to secure the major portion of the reducing properties of the metallic iron for the dissolved copper. Longer retention time produces a higher grade of cement copper while a lower retention time produces a lesser grade but permits more rapid operation of the apparatus. The addition of the metallic iron to the incoming concentrated copper solution permits achieving an effluent solution cupric content to the thickener 19 at or below one gram per liter while at the same time producing a cement copper product which is fully comparable in grade to the cement copper produced when the agitated tank effluent solution cupric content is at a level much greater than 1 gram per liter. An example from actual experimentation demonstrates these conclusions. In this example a series of 18 tests were run in which nine experimental conditions were duplicated. The variables in the tests were the agitated tank retention time and the effluent solution copper concentration. The feed materials were 30.0 grams per liter cupric sulfate solutions and powdered sponge iron. Table I lists the average results of each set of experimental conditions.

The data of Table I is arranged into three sets of three runs each. The outlet solution copper assays of the runs within any one set are similar but the tank retention times are variable. An inspection of the solids copper assays within any one set shows that the grade of cement copper produced improves with a longer retention time. An inspection of the solids assays from runs with identical retention times in the different sets does not indicate any significant trend in the quality of the cement copper product even though the outlet solution copper concentration changes significantly.

TABLE I

| Agitated Tank Retention Time | Agitated Tank Outlet Solution Cupric Assay | Agitated Tank Outlet Solids Copper Assay |
| --- | --- | --- |
| Set 1 | | |
| 5.0 min. | 9.50 g/l | 83.9% |
| 12.5 min. | 8.41 g/l | 87.0% |
| 20.0 min. | 8.85 g/l | 87.5% |
| Set 2 | | |
| 5.0 min. | 5.85 g/l | 85.2% |
| 12.5 min. | 5.21 g/l | 87.1% |
| 20.0 min. | 3.72 g/l | 88.3% |
| Set 3 | | |
| 5.0 min. | 1.59 g/l | 84.6% |
| 12.5 min. | 0.26 g/l | 86.4% |
| 20.0 min. | 0.44 g/l | 87.7% |

The process operates essentially identically under any conditions of the feed solution no matter how concentrated the solution may be with respect to the recoverable metallic ion. The major portion of the cementation process takes place in a truly continuous apparatus which is devoid of any cyclic operating nature. The solution is then in a state of low concentration suitable for feeding to a conventional scrap iron or powdered iron device. The equipment size is largely independent of the feed stream concentration, and the parts of the process which are cyclic still have a frequency cycle independent of the cupric concentration of the feed stream and long enough for efficient operation.

Under actual operating conditions the advantages of the invention were thoroughly proven. Thus the following illustrates three separate examples of actual operating results.

EXAMPLE 1

3500 gallons of feed solution containing 24 grams of dissolved copper per liter was processed according to this invention and produced a cement copper product assaying 93.3% copper. The effluent barren solution totaled about 3500 gallons and contained only 0.01 gram per liter of copper, therefore showing a copper recovery of 99.96%.

EXAMPLE 2

In a further test of the invention the same amount of feed solution containing 24 grams per liter of copper was processed to give a barren solution of 0.01 gram per liter copper but the agitated tanks were used without the cleanup cone. The same recovery of copper was achieved but the cement copper assayed only 88.3% copper.

EXAMPLE 3

A copper solution containing 2 grams per liter of copper was processed through a sponge iron clean-up cone as described herein but without the two agitated tanks and produced a barren solution of 0.01 gram per liter copper and a cement copper assaying 67.2% copper. This shows that if the feed solution in Examples 1 and 2 had been diluted to this 2 grams per liter copper the copper recovery would have been 99.5% but the cement copper would have analyzed only 67.2% copper.

The above examples show that improved copper quality and increased yields result from this invention.

This invention achieves a number of advantages that are not possible with any prior processes and systems of which applicants are aware. The major portion of the process is continuous with all the resulting advantages as contrasted to a batch process. Furthermore, the system is independent of the concentration of the copper in the feed solution as no matter how high the concentration of dissolved copper the final effluent is a substantially barren solution and the copper is precipitated for easy separation as in the filter of the illustrated embodiment.

By operating the agitated tanks at an effluent copper concentration of 1 gram of copper per liter, there is no excess of metallic iron reactant in the product and the percent copper in the cement copper product is determined by the quality of the sponge iron precipitant. This means that copper is produced under conditions to give the highest possible copper assay in the product.

The agitated tanks of this invention provide a reaction zone which always contains particles of cement copper. These particles agglomerate and grow to produce a coarser cement copper product which has improved filtering and drying properties. Some of the cement copper particles may even become too large to overflow the agitated tank and bottom outlets must be provided on the tanks so that these larger particles can be periodically removed from the system.

Operation of agitated tanks prior to a clean-up cone provides a feed solution for the clean-up cone which is more suitable for good cone operation than normal cone feed solutions. All ferric iron has been removed from the solution, the solution copper concentration is controlled at a specific predetermined low level, the acidity is less variable and the flow volume is constant. This consistency of feed solution results in better cone operation.

Having described our invention as related to the embodiment set out herein, it is our intention that the invention be not limited by any of the details of description, unless otherwise specified, but rather be construed broadly within its spirit and scope as set out in the appended claims.

We claim:

1. The method of recovering solid copper metal from a flowing dilute acidic copper solution containing greater than 5 grams per liter of dissolved copper in the form of salts to produce solid cement copper and substantially copper free barren solution, comprising: continuously contacting said flowing solution with iron to form a mixture of a low copper content solution having a maximum dissolved copper content of approximately 1 gram of copper in the form of dissolved salts per liter of solution and solid copper particles; directing said mixture of low copper content solution and copper particles to a thickener; continuously separating in said thickener said solid copper particles from said resulting low copper content solution; then contacting said resulting low copper content solution with additional iron in a clean up step to precipitate substantially all of the remaining dissolved copper from said resulting low copper content solution to form more solid cement copper and the substantially copper free barren solution; directing said precipitated remaining copper with a portion of said barren solution into said thickener; and discarding the remaining said barren solution from said solution clean up step.

2. The method of claim 1 wherein said continuous contacting is conducted in a successive series of agitator equipped tanks with the liquid being conveyed from one tank to the next and the solution and solids from all tanks conveyed to said thickener which comprises a separator in which the liquid fraction is separated from the solids fraction.

3. The method of claim 2 wherein said liquid is conveyed from the top of one tank into the top of the next in said series and from the top of the last tank into said receiver.

4. The method of claim 2 wherein said agitator tanks cause copper lumps to form therein from the thusly precipitated copper, and these lumps are directed from the bottoms of each of said tanks into the tops of successive tanks and finally from the bottom of the last tank in said series directly into said thickener.

5. The method of claim 2 wherein said liquid is conveyed from the top of one tank into the top of the next in said series and from the top of the last tank into said thickener and said agitator tanks cause copper lumps to form therein from the thusly precipitated copper, and these lumps are directed from the bottoms of each of said tanks into the tops of successive tanks and finally from the bottom of the last tank in said series directly into said thickener.

6. The method of claim 1 wherein said precipitating of substantially all of the remaining dissolved copper takes place in a clean-up cone into which fresh iron is introduced for said contacting of said resulting solution and from which said barren solution is conducted from adjacent the top of said cone and said remaining copper and solution portion from the side of said cone.

* * * * *